United States Patent
Nash-Putnam (10) Patent No.: US 7,124,442 B2
(45) Date of Patent: Oct. 17, 2006

(54) SYSTEM AND METHOD FOR INSERTION AND RETRIEVAL OF MICROTHREADS IN TRANSMITTED DATA

(75) Inventor: Jon Nash-Putnam, Santa Fe, NM (US)

(73) Assignee: 440 Pammel, Inc., Evergreen, CO (US)

(*) Notice: Subject to any disclaimer, the term of this patent is extended or adjusted under 35 U.S.C. 154(b) by 897 days.

(21) Appl. No.: 09/915,174

(22) Filed: Jul. 25, 2001

(65) Prior Publication Data

US 2003/0021414 A1    Jan. 30, 2003

(51) Int. Cl.
*H04L 9/00* (2006.01)

(52) U.S. Cl. .................. 726/26; 726/19; 726/30; 713/161; 713/168; 713/176; 713/180; 380/36; 380/42; 380/43; 380/252

(58) Field of Classification Search .......... 380/52; 713/161
See application file for complete search history.

(56) References Cited

U.S. PATENT DOCUMENTS

| | | | |
|---|---|---|---|
| 5,613,004 A | 3/1997 | Cooperman et al. | 380/28 |
| 5,636,292 A | 6/1997 | Rhoads | 382/232 |
| 5,687,236 A | 11/1997 | Moskowitz et al. | 380/28 |
| 5,850,481 A | 12/1998 | Rhoads | 382/232 |
| 5,889,868 A | 3/1999 | Moskowitz et al. | 380/51 |
| 5,905,800 A | 5/1999 | Moskowitz et al. | 380/28 |
| 6,026,193 A | 2/2000 | Rhoads | 382/232 |
| 6,047,374 A | 4/2000 | Barton | 713/150 |
| 6,101,604 A | 8/2000 | Barton | 713/176 |
| 6,163,842 A | 12/2000 | Barton | 713/176 |
| 6,205,249 B1 | 3/2001 | Moskowitz | 382/232 |
| 6,216,228 B1 | 4/2001 | Chapman et al. | 713/176 |
| 6,285,774 B1* | 9/2001 | Schumann et al. | 382/100 |
| 6,625,295 B1* | 9/2003 | Wolfgang et al. | 382/100 |
| 6,668,246 B1* | 12/2003 | Yeung et al. | 705/57 |
| 6,721,437 B1* | 4/2004 | Ezaki et al. | 382/100 |
| 2002/0076043 A1 | 6/2002 | Van Der Vleuten et al. | 380/37 |

FOREIGN PATENT DOCUMENTS

| | | |
|---|---|---|
| EP | 0 899 688 A2 | 3/1999 |
| EP | 0 859 503 A3 | 12/1999 |
| EP | 1 031 944 A1 | 8/2000 |
| EP | 1 063 833 A2 | 12/2000 |
| EP | 1 075 108 A1 | 2/2001 |

(Continued)

OTHER PUBLICATIONS

Memon, N., et al, 'A Buyer-Seller Watermarking Protocol', IEEE Signal Processing Society 1998 Workshop on Multimedia Signal Processing, Dec. 7-9, 1998, Los Angeles, California, USA Electronic Proceedings © 1998 IEEE, entire document http://www.tsi.enst.fr/~maitre/tatouage/mmsp98/355/index.htm.*

(Continued)

*Primary Examiner*—Nasser Moazzami
*Assistant Examiner*—Ronald Baum
(74) *Attorney, Agent, or Firm*—Bruce E. Hayden (57) ABSTRACT

A system for the insertion of microthreads in transmitted data is provided. The system includes a digital content system providing carrier data, such as sampled audio data. A microthread insertion system coupled to the digital content system generates a composite data sequence that includes the carrier data and microthread data, such as broadcast verification data. The microthread data is camouflaged using the carrier data, such as by including in the audio signal in a manner that allows it to be detected but which does not noticeably affect the audio signal for listeners.

20 Claims, 8 Drawing Sheets

FOREIGN PATENT DOCUMENTS

| | | |
|---|---|---|
| EP | 1 079 627 A1 | 2/2001 |
| WO | WO 00/25203 | 5/2000 |
| WO | WO 00/54453 | 9/2000 |
| WO | WO 01/22652 A2 | 3/2001 |
| WO | WO 01/45316 A1 | 6/2001 |
| WO | WO 01/45410 A2 | 6/2001 |

OTHER PUBLICATIONS

Search Report for PCT/US02/23646 Dated Jan. 10, 2003 in related PCT filing of pending U.S. Appl. No. 09/915,174.

* cited by examiner

| VERSION 1002 | LENGTH 1004 | SERVICE TYPE 1006 | TOTAL LENGTH 1008 | |
|---|---|---|---|---|
| IDENTIFICATION 1010 | | | FLAGS 1012 | FRAGMENT OFFSET 1014 |
| TIME TO LIVE 1016 | | PROTOCOL 1018 | HEADER CHECKSUM 1020 | |
| SOURCE IP ADDRESS 1022 | | | | |
| DESTINATION IP ADDRESS 1024 | | | | |
| IP OPTIONS 1026 | PADDING 1028 | CAMOUFLAGED MICROTHREAD 1028A | | LOCATOR DATA 1028B |
| DATA 1030 | | | | |

SYSTEM AND METHOD FOR INSERTION AND RETRIEVAL OF MICROTHREADS IN TRANSMITTED DATA

FIELD OF THE INVENTION

The present invention relates generally to verification, authentication or identification systems or methods, and more particularly, it relates to inserting and detecting microthreads within lossy and lossless transmitted data.

BACKGROUND OF THE INVENTION

Systems for identifying, verifying, or authenticating transmitted data are known in the art. Such systems allow a transmitted data signal, also known as carrier data, to be marked with a verification code sequence identifying the owner, time of production, title, or other suitable data. The verification code sequence is used to identify the carrier data so as to verify performance of the carrier data, determine the source of the carrier data, or perform other suitable functions.

One significant drawback with such systems when used for lossy data (such as audio data), is that a user must manually input the verification code sequences into the carrier data. For example, the verification code sequence must be manually inserted into the carrier data, or it is possible that the verification code sequence will be noticeable when the carrier data is converted back to an audio signal. In order to perform this manual insertion, an operator must map the data stream and select areas where the insertion is believed to be acceptable. This map must then be provided to the receiver in order to decode the received carrier data and locate the inserted verification code sequences.

In the case of lossless digital data transmission, such as data that is transmitted in accordance with a standard protocol such as TCP/IP, it is possible to insert verification data at predetermined locations, which can then be extracted without a noticeable effect on quality. Nevertheless, once these locations have been determined, unauthorized individuals can remove the verification data so as to obscure the source of the data.

SUMMARY OF THE INVENTION

In accordance with the present invention, a system and method for inserting and detecting microthreads in transmitted data are provided that overcome known problems with verifying the transmission of data. In particular, a system and method for inserting and detecting microthreads in transmitted data are disclosed that allow verification of the receipt of the transmitted data, authentication of transactions that use the transmitted data, and automated activation of processes based on the transmitted data.

In accordance with an exemplary embodiment of the present invention, a system for the insertion of microthreads in transmitted data is provided. The system includes a digital content system providing carrier data, such as sampled audio data. A microthread insertion system coupled to the digital content system generates a composite data sequence that includes the carrier data and microthread data, such as broadcast verification data. The microthread data is camouflaged using the carrier data, such as by including in the audio signal in a manner that allows it to be detected but which does not noticeably affect the audio signal for listeners.

The present invention provides many important technical advantages. One important technical advantage of the present invention is a system for the automated insertion and retrieval of microthreads in lossy or lossless transmitted data that allows verification, authentication, or activation of processes to be performed. The present invention thus eliminates the need for manually inserting code sequences and the time and cost associated with manually inserting these code sequences within transmitted data.

Those skilled in the art will further appreciate the advantages and superior features of the invention together with other important aspects thereof on reading the detailed description that follows in conjunction with the drawings.

DETAILED DESCRIPTION OF THE INVENTION

In the description that follows, like parts are marked throughout the specification and drawings with the same reference numerals, respectively. The drawing figures might not be to scale and certain components can be shown in generalized or schematic form and identified by commercial designations in the interest of clarity and conciseness.

Figure 1:
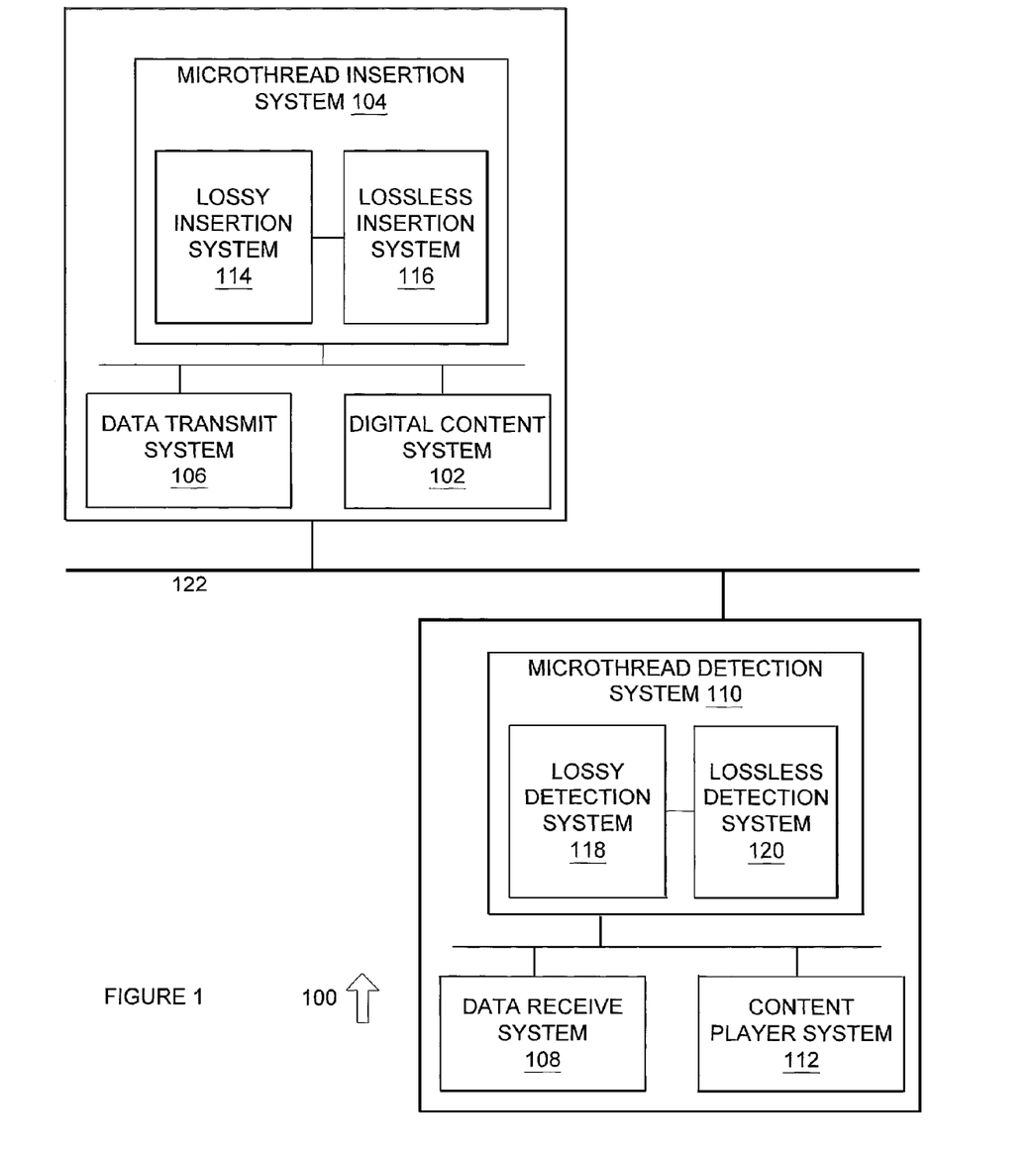
FIG. 1 is a diagram of a system for the insertion and detection of microthread data in transmitted data in accordance with an exemplary embodiment of the present invention.

FIG. 1 is a diagram of a system 100 for the insertion and detection of microthread data in transmitted data in accordance with an exemplary embodiment of the present invention. System 100 performs real-time, automated insertion of microthread data within lossy or lossless carrier data and verifies the reception of the microthread data in the carrier data, so as to allow authentication of transactions and activation of processes dependent on verified receipt of the carrier data.

System 100 includes content system 102, which can be implemented in hardware, software, or a suitable combination of hardware and software, and which can be one or more software systems operating on a general purpose server platform. As used herein, a software system can include one or more objects, agents, threads, subroutines, separate software applications, two or more lines of code or other suitable software structures operating in two or more separate software applications, on two or more different processors, or other suitable software architectures. In one exemplary embodiment, a software system can include one or more lines of code or other suitable software structures operating in a general purpose software application, such as an operating system, and one or more lines of code or other suitable software structures operating in a specific purpose software application. In another exemplary embodiment, a software system can be one or more lines of hypertext markup language (HTML), extensible markup language (XML), a web browser plug-in, or other suitable code that operates in conjunction with a web browser application.

Content system 102 is coupled to microthread insertion system 104, data transmit system 106, data receive system 108, microthread detection system 110 and content player system 112 via communications medium 122. As used herein, the term "couple," and its cognate terms such as "couples" and "coupled," can include a physical connection (such as through one or more copper conductors), a virtual connection (such as one or more randomly assigned data memory locations of a data memory device), a logical connection (such as through one or more logical devices of a semiconducting circuit), a wireless connection, a hypertext transfer protocol (HTTP) connection, other suitable connections, or a suitable combination of such connections. In one exemplary embodiment, systems and components can be coupled to other systems and components through intervening systems and components, such as through an operating system of a general purpose server platform.

Communications medium 122 can be the Internet, a local area network, a wide area network, the public switched telephone network, a wireless network, fiber-optic network, other suitable communications media, or a suitable combination of such communications media.

In one exemplary embodiment, content system 102 can provide digital carrier data to microthread insertion system 104. The digital carrier data can be lossy data (such as sampled audio or video data), lossless data (such as TCP/IP format data), or other suitable data. Lossless data can include relevant data sequences describing routing information and control information associated with data delivery, such as an Internet protocol (IP) frame header, a transmission control protocol (TCP) header, user datagram protocol (UDP) header, or other suitable protocol headers. In one exemplary embodiment, the microthread data can be provided to content system 102, such as prior to or after the provision of the carrier data.

Microthread insertion system 104 includes lossy insertion system 114 and lossless insertion system 116, each of which can be implemented in hardware, software, or a suitable combination of hardware and software, and which can be one or more software systems operating on a general purpose server platform. In one exemplary embodiment, microthread insertion system 104 receives the carrier data, microthread data, and other suitable data from content system 102 and generates a composite data sequence. The composite data sequence can be comprised of the carrier data, one or more instances of the microthread data, one or more flag data sequences, and other suitable data. Microthread insertion system 104 then provides the composite data sequence to data transmit system 106.

Lossy insertion system 114 receives lossy carrier data and microthread data, and inserts the microthread data into the lossy carrier data in real-time. In one exemplary embodiment, lossy insertion system 114 encrypts the microthread data prior to insertion, such as by using random key, a pseudorandom key, or by other suitable processes. The microthread data can include data used to verify receipt of the carrier data, date and time stamp data, quality of transmission data (such as data that is used to determine whether the transmission quality meets minimum predetermined criteria), advertiser identification data, broadcaster identification data, transmitter identification data, or other suitable data. Lossy insertion system 114 then generates the composite data sequence that includes the lossy carrier data and the microthread data. In one exemplary embodiment, lossy insertion system 114 analyzes the carrier data to identify areas having a predetermined level of data value fluctuation, such as areas in which the standard deviation exceeds a predetermined value, areas in which the absolute magnitude of the change in two or more successive data entries exceeds a predetermined value, or other suitable areas. The microthread data can then be encoded into the carrier data following that location, so as to utilize a repeatable measurement within the carrier signal as a flag. Furthermore, insertion of the microthread data in an area in which data signal valuation fluctuations exceed a predetermined level decreases the likelihood that any variation in the carrier signal will be detected, such as by the human ear for audio data, by the human eye for video data, or by other suitable procedures. Lossy insertion system 114 can then further encrypt the composite data sequence using a random key, pseudorandom key, the key used to encrypt the microthread data, or other suitable procedures. Lossy insertion system 114 can then provide any data required to decrypt the microthread (such as a pseudorandom key), the composite data sequence, and other suitable data to data transmit system 106.

Lossless insertion system 116 receives lossless data to serve as the carrier data. Lossless insertion system 116 can receive the microthread data from content system 102, can generate the microthread data, or can receive the microthread data in other suitable manners. Lossless insertion system 116 encrypts the microthread data, such as by using a random or pseudorandom key or other suitable procedure, and generates the composite data sequence that includes the carrier data and the microthread data. In one exemplary embodiment, lossless insertion system 116 inserts the microthread data into the padding data sequence of the areas describing routing information and control information associated with data delivery, such as an IP frame header, a TCP header, a UDP header, or other suitable protocol headers. The microthread data can include data that defines the next location of the microthread data in the data packet stream, so as to increase the difficulty of detecting the microthread data. Lossless insertion system 116 can then provide any data required to decrypt the microthread data (such as a pseudorandom key), the composite data sequence, and other suitable data to data transmit system 106.

Data transmit system 106 can be implemented in hardware, software, or a suitable combination of hardware and software, and can be a radio frequency transmitter station in the case of lossy data, or one or more software systems operating on a general purpose processing platform in the case of lossless data. In one exemplary embodiment, data transmit system 106 can be an account, a folder, a database or other suitable system on a server of a radio or television broadcast station, a broadcasting authority, a transmitter, or other suitable organization. Data transmit system 106 transmits the composite data sequence, decryption data (such as a pseudorandom key), and other suitable data to data receive system 108 over communications medium 122. For example, data transmit system 106 can transmit radio advertisement data to a receiver. The radio advertisement data can include microthread data that contains broadcast date and time stamp data, copyright data, station identification data, quality of transmission data, or other suitable data. In one exemplary embodiment, data transmit system 106 can transmit decryption data such as a pseudorandom key separate from the composite data sequence.

Data receive system 108 can be implemented in hardware, software, or a suitable combination of hardware and software, and can be a radio frequency receiver in the case of lossy data, one or more software systems operating on a general purpose processing platform in the case of lossless data, or other suitable systems. In one exemplary embodiment, data receive system 108 can be an account, a folder, a database or other suitable system on a server of a radio or television broadcast station, a broadcasting authority, a transmitter, or other suitable organizations. In another exemplary embodiment, data receive system 108 can be a transmission receiving authority or organization which receives lossy data from one or more broadcasting stations, data transmission stations, a broadcasting authority, or other suitable organizations. Data receive system 108 receives the composite data sequence and the decryption data (such as a pseudorandom key) from data transmit system 106 over communications medium 122, and provides the data to microthread detection system 110.

Microthread detection system 110 includes lossy detection system 118 and lossless detection system 120, each of which can be implemented in hardware, software, a suitable combination of hardware and software, and which can be one or more software systems operating on a general purpose processing platform. Microthread detection system 110 extracts the microthread data from the composite data sequence and provides the microthread data to content player system 112.

Lossy detection system 118 receives the composite data sequence comprised of lossy data, one or more microthreads, and other suitable data, and extracts the microthread data from the composite data sequence. Lossy detection system 118 can also receive decryption data (such as a pseudorandom key) from data receive system 108, and can decrypt the composite data, the microthread data, and other suitable data. In one exemplary embodiment, lossy detection system 118 decrypts the composite data, extracts the microthread data, and then further decrypts the microthread data.

Lossless detection system 120 receives the composite data sequence comprised of lossless data packets and extracts the microthread data from the padding data sequence of the areas describing routing and control information in the lossless data. Lossless detection system 120 can also receive decryption data (such as a pseudorandom key) from data receive system 108, and can decrypt the composite data, the microthread data, and other suitable data. In one exemplary embodiment, lossless detection system 120 decrypts the composite data, extracts the microthread data, and then further decrypts the microthread data. In another exemplary embodiment, lossless detection system 120 determines the next location for the microthread data in a subsequent data packet based upon the decrypted microthread data.

Content player system 112 can be implemented in hardware, software or a suitable combination of hardware and software, and can be one or more software systems operating on a general purpose processing platform. Content player system 112 receives the decrypted composite data sequence, the decrypted and extracted microthread data, and other suitable data. In one exemplary embodiment, content player system 112 can verify that the received composite data sequence matches log data, has been received at the location to which the data has been transmitted, has been received from an authorized source, or that other verification data is present. In another exemplary embodiment, content player system 112 can initiate an action upon receipt of the microthread data.

In operation, system 100 performs real-time insertion and detection of microthread data in carrier data. System 100 allows the insertion of authenticating codes, date and time stamps, tracking codes, control codes, other verification identifiers, and other suitable data into carrier data in a manner that does not effect the quality or use of the carrier data. In this manner, system 100 can be used to monitor carrier data and provide proof of performance of broadcast events, verify the transmission source for the enforcement of copyrights or for authentication of confidential transactions, activate processes dependent on the carrier data, or perform other suitable functions.

In one exemplary embodiment, system 100 can be used to provide an audit trail for power commodity transactions, to facilitate power transmission and distribution monitoring, to facilitate automated meter reading, for distribution system maintenance, and for other suitable purposes in a power generation, transmission, and distribution system. In this exemplary embodiment, microthread tracking code data can be inserted directly onto the 60 Hz or other power frequency signal using power line carrier technology. These codes can be inserted at each generation point and repeated at each transformer point along the transmission path and load. Metric data defining the transmission path identity and characteristics can also be inserted at each transformer station for monitoring purposes, and metric data can be inserted at the destination load to automate usage metering.

In another exemplary embodiment, microthread data can be used for transaction authentication, document verification or authentication, wire transfer authentication, or other suitable purposes in banking or financial transactions. The microthread data can be provided with lossless banking data or financial data to serve as a transaction identifier, authentication code, verification code, or other suitable code that can be stored with the data record at the financial institution, at the customer site, or at other suitable locations.

In yet another exemplary embodiment, microthread data can be provided with medical billing or payment transaction data for transaction authentication, with medical record data for transmission or source verification or authentication, with medical image data for transmission or source verification or authentication, or for other suitable medical or insurance purposes. The microthread can include a unique transaction code, authentication code, verification code, or other suitable reference key to a data record resident at the medical facility, insurance institution, service provider, consumer site, or other suitable locations.

In a further exemplary embodiment, microthread data can be provided for mandated activity authentication, justice or human services record verification or authentication, medical image authentication or verification, or for other suitable purposes for justice or human services. The microthread can include a unique transaction code, authentication code, verification code, or other suitable reference key to a data record resident at the correction/probation facility, state or federal human services facility, service provider, client site, or other suitable locations.

In another exemplary embodiment, microthread data can be provided for proof of purchase, content license, and market intelligence data gathering purposes in data transmitted over the Internet or other suitable media. The microthread data can include a unique transaction code or other suitable reference key to a data record resident at the content provider site that includes the source, content, and purchaser information of each downloaded content item.

Figure 2:
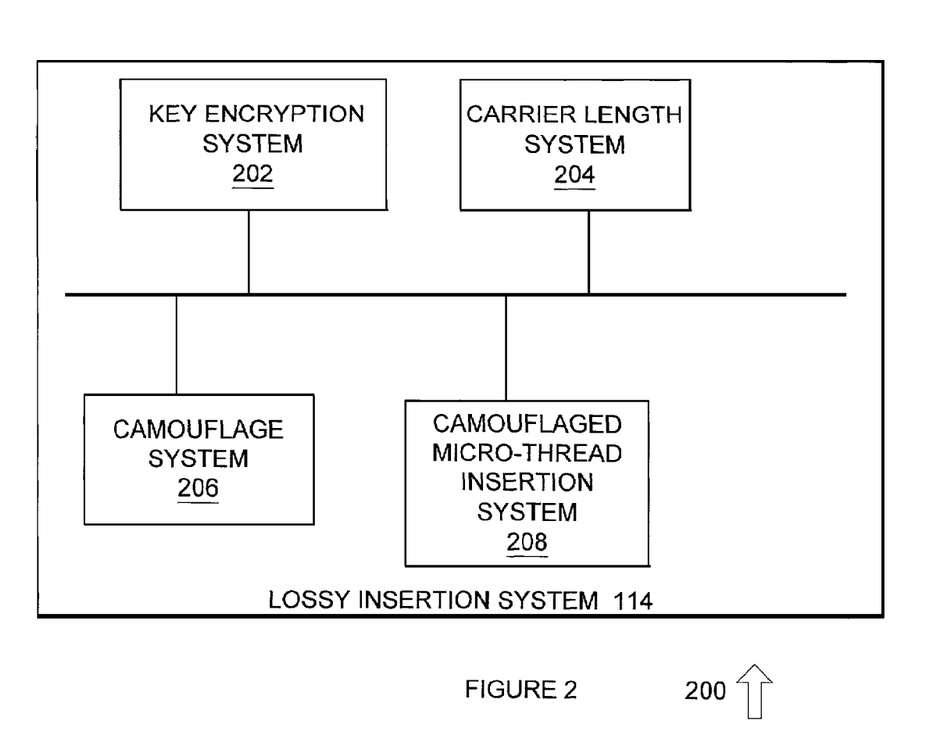
FIG. 2 is a diagram of a system for inserting microtiread data into lossy data in accordance with an exemplary embodiment of the present invention.

FIG. 2 is a diagram of a system 200 for inserting microthread data into lossy data in accordance with an exemplary embodiment of the present invention. System 200 includes lossy insertion system 114 and key encryption system 202, carrier length system 204, camouflage system 206 and camouflaged microthread insertion system 208, each of which can be implemented in hardware, software, or suitable combination of hardware and software, and which can be one or more software systems operating on a general purposes processing platform.

Key encryption system 202 generates an encrypted version of microthread data using a random key, a pseudorandom key, or other suitable encryption processes, including those that don't explicitly require a key. The microthread data can contain verification of receipt data, advertising data, date and time stamp data, quality of transmission data, broadcaster identification data, or other suitable data. In one exemplary embodiment, key encryption system 202 generates a random bit string having a predetermined length, which is used as a pseudorandom key. In another exemplary embodiment, key encryption system 202 generates a pseudorandom bit string to act as the pseudorandom key, where the bit string has a predetermined length that is small enough to be unnoticeable to the human eye or ear after the carrier data has been converted to an audio signal, video signal, graphic image, or other suitable data. Key encryption system 202 then encrypts the microthread data using the key or other suitable processes. In one exemplary embodiment, key encryption system 202 can also encrypt the composite data sequence after the microthread data has been inserted into the carrier data. Key encryption system 202 can also provide the encryption data, such as a pseudorandom key, to data transmit system 106 of FIG. 1.

Carrier length system 204 receives the carrier data from content system 102 of FIG. 1 and determines if the carrier data has sufficient length to be encoded with one or more repetitions of the microthread data. In one exemplary embodiment, if the carrier data is insufficient, the carrier data can be repeated until the carrier data has sufficient length to contain at least one repetition of the microthread data. Carrier length system 204 then provides the carrier data to camouflage system 206.

Camouflage system 206 receives the encrypted microthread from key encryption system 202 and the carrier data from carrier length system 204. In one exemplary embodiment, camouflage system 206 analyzes the carrier data to locate areas where the variation in the carrier data exceeds a predetermined level. For example, camouflage system 206 can receive audio data, video data, graphic image data, or other suitable data and can locate areas where the change in value between two sequential n-bit samples exceeds a predetermined amount. Because such changes indicate a section of audio data in which irregular data having a short duration would be less likely to be noticed by the human eye or ear, flag data and microthread data can be inserted after such sections in a manner that can allows for automated insertion and detection. In another exemplary embodiment, camouflage system 206 can detect areas within carrier data that are not used to convey audio data, video data, graphic image data, or other suitable payload data.

Camouflage system 206 can also scan an area occurring after a detected insertion point to determine whether the variation in audio signal data after the insertion point is sufficient to allow the microthread data to be inserted without being noticeable to the human ear. In one exemplary embodiment, the standard deviation of subsequent data point variations, the mean of the absolute values in variation, or other suitable statistical data can be used to determine whether the area following an insertion point is of sufficient length. Camouflage system 206 can then mark the areas of interest that are of sufficient length to embed the encrypted microthread with a flag data sequence.

Camouflage system 206 also creates the encrypted microthread camouflage and inserts the encrypted and camouflaged microthread into the carrier data. In one exemplary embodiment, camouflage system 206 replicates the data sequence following the insertion point for the length of the encrypted microthread and stores the replicated data sequence in memory. Camouflage system 206 then generates the camouflaged microthread, such as subtracting the encrypted microthread from the replicated data sequence (D1), adding the encrypted microthread from a second instance of the replicated data sequence (D2), or performing other suitable processes.

Camouflaged microthread insertion system 208 receives the camouflaged microthread from camouflage system 206 and generates a composite data sequence. The composite data sequence can be comprised of the camouflage microthread, the carrier data, and other suitable data. In one exemplary embodiment, camouflaged microthread insertion system 208 generates the composite data sequence by inserting the camouflaged microthread after an insertion point, such as by inserting D1 and D2 into the carrier signal after the insertion point. Flag data can also be provide between the insertion point and D1 and D2, so as to provide verification of the microtiread data insertion point.

In operation, system 200 generates a composite data sequence including lossy carrier data and microthread data. Target areas for the insertion of the microthread data are first identified, such as by using a characteristic of the carrier data that indicates an area where minor changes in the data would not be noticed. The microthread data is then camouflaged, such as by using the carrier data after the insertion point, so as to minimize the amount of signal variation created by insertion of the microthread data.

Figure 3:
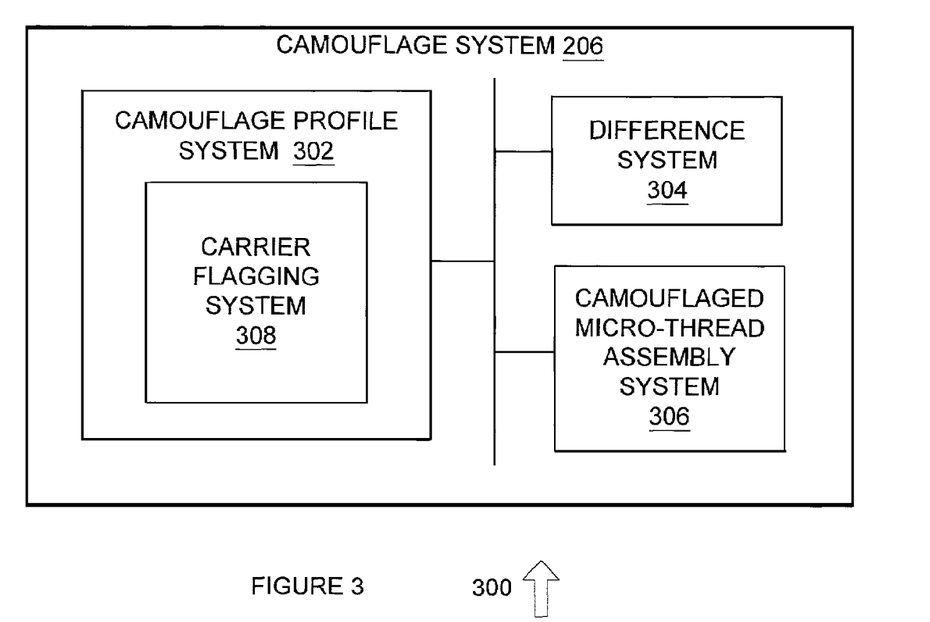
FIG. 3 is a diagram of a system for generating a camouflaged microthread for insertion into lossy carrier data in accordance with an exemplary embodiment of the present invention.

FIG. 3 is a diagram of a system 300 for generating a camouflaged microthread for insertion into lossy carrier data in accordance with an exemplary embodiment of the present invention. System 300 includes camouflage system 206 and camouflage profile system 302, difference system 304, and camouflaged microthread assembly system 306, each of which can be implemented in hardware, software, or a suitable combination of hardware and software, and which can be one or more software systems operating on a general purpose server platform.

Camouflage profile system 302 generates the camouflage pattern for the creation of the camouflaged microthread based on the areas of interest within the carrier data stream, such as areas occurring after an insertion point. Camouflage profile system 302 can store a section of the carrier data that will then be used to camouflage the microthread data or other suitable camouflage data.

Carrier flagging system 308 provides flag data for insertion in the carrier data after an insertion point, such as to provide an indicator of the existence of a camouflaged microthread. The flag data can be a short sequence of data that is used to confirm that a camouflaged microthread has been inserted. In another exemplary embodiment, the flag data can include data that is used to locate the next insertion point, data that is used to select an arithmetic operation to be performed on the carrier data following the flag data in order to extract the encrypted microthread, or other suitable data.

Difference system 304 receives the camouflage pattern from camouflage profile system 302 and the encrypted microthread and generates difference data. In one exemplary embodiment, the difference data can include a first set of data in which the encrypted microthread data has been subtracted from the camouflage pattern (D1), and a second set of data in which the encrypted microthread data has been added to the camouflage pattern (D2). In this manner, the encrypted microthread can be extracted by subtracting D1 from D2 and dividing the result by two. Other suitable processes can be implemented by difference system 304.

Camouflaged microthread assembly system 306 receives the difference data from difference system 304 and generates the camouflaged microthread. In one exemplary embodiment, the camouflaged microthread can include D1 and D2, in addition to flag data that is used to indicate a mathematical procedure that is to be performed on D1 and D2 to yield the encrypted microthread.

In operation, system 300 generates a camouflaged microthread for subsequent insertion into carrier data. System 300 allows an encrypted microthread to be camouflaged by using the carrier data, such that the insertion of the microthread data into the carrier data does not result in a noticeable degradation of the signal.

Figure 4:
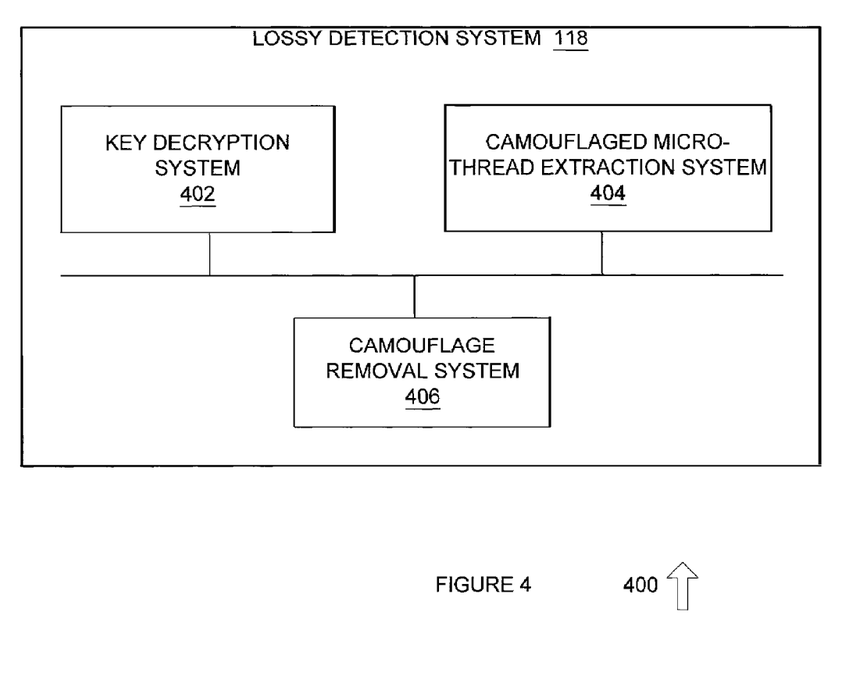
FIG. 4 is a diagram of a system for detecting microthreads within the composite data sequence comprised of lossy data in accordance with an exemplary embodiment of the present invention.

FIG. 4 is a diagram of a system 400 for detecting microthreads within the composite data sequence comprised of lossy data in accordance with an exemplary embodiment of the present invention. System 400 includes lossy detection system 118 and key decryption system 402, camouflaged microthread extraction system 404, and camouflage removal system 406, each of which can be implemented in hardware, software, or a suitable combination of hardware and software, and which can be one or more software systems operating on a general purpose server platform.

Key decryption system 402 generates a decrypted version of an encrypted data sequence using a random key, a pseudorandom key, or other suitable decryption mechanisms. Key decryption system 402 can receive a key or other decryption data and encrypted composite data, and can then decrypt the encrypted composite data. Key decryption system 402 can further decrypt the encrypted microthread after it has been extracted from the composite data, such as by using the same decryption key, a different decryption key, or other suitable data.

Camouflaged microthread extraction system 404 receives the decrypted composite data from key decryption system 402 and extracts the microthread data from the composite data. Camouflaged microthread extraction system 404 detects the insertion points for the camouflaged microthreads, such as by determining whether the difference between two successive values of data exceeds a predetermined value, determining whether flag data has been inserted, or by other suitable processes.

Camouflage removal system 406 receives the camouflaged microthread from camouflaged microthread extraction system 404 and removes the camouflage from the camouflaged microthread to reveal the encrypted microthread. In one exemplary embodiment, camouflage removal system 406 can remove the camouflage by performing a mathematical operation on two or more data sequences that following an insertion point and flag data. The flag data can likewise be used to identify the mathematical operation.

In operation, system 400 decrypts composite data and locates encrypted microthread data in the decrypted composite data. The encrypted microthread data is then extracted from the decrypted composite data, and is decrypted. In this manner, the source, date and time of transmission, and other suitable data pertaining to the carrier data can be verified, and other suitable processes can be performed.

Figure 5:
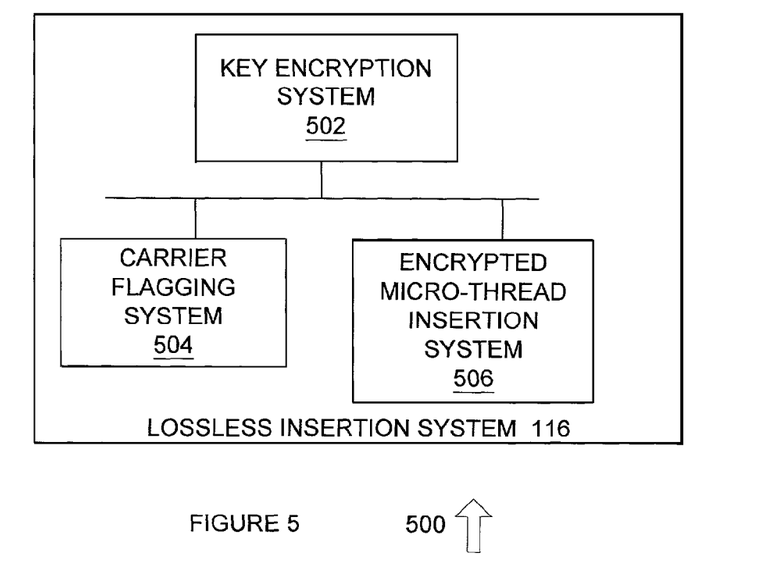
FIG. 5 is a diagram of a system for inserting microthread data into lossless data in accordance with an exemplary embodiment of the present invention.

FIG. 5 is a diagram of a system 500 for inserting microthread data into lossless data in accordance with an exemplary embodiment of the present invention. System 500 includes lossless insertion system 116 and key encryption system 502, carrier flagging system 504 and encrypted microthread insertion system 506, each of which can be implemented in hardware, software, or suitable combination of hardware and software, and which can be one or more software systems operating on a general purposes processing platform.

Key encryption system 502 receives microthread data and generates an encrypted version of microthread data using a random key, pseudorandom key, or other suitable encryption processes. In one exemplary embodiment, key encryption system 502 parses the microthread data so as to allow it to be inserted into predetermined locations of a TCP/IP data frame, a UDP data frame, or other suitable data frames. The parsing data can then be stored for use in locating and assembling the microthread data. Alternatively, the microthread data may be inserted into each data frame, every other data frame, every third data frame, into a predetermined or randomly generated sequence of data frames, or in other suitable manners.

Carrier flagging system 504 receives encrypted microthread data, parsing data, and other suitable data from key encryption system 502 and the carrier data, and generates flag data for locating the microthread data and parsing data within the carrier data. In one exemplary embodiment, the flag data can include the parsing data, such that the flag data identifies the location within one or more carrier data frames where the microthread data can be located, the re-assembly sequence for parsed microthread data, or other suitable data. In another exemplary embodiment, the flag data can identify the location of the next data frame in which the microthread data has been stored, the sequence of data frames, or other suitable data.

Encrypted microthread insertion system 506 receives the carrier data, the microthread data, flag data, and other suitable data and assembles the composite data. In one exemplary embodiment, the composite data can then be encrypted using key encryption system 502, or other suitable processes can be performed.

In operation, system 500 inserts encrypted microthread data into lossless data, such as one or more data frames.

System 500 allows the microthread data to be inserted into predetermined or random locations within the data frames, and further allows the microthread data to be parsed or inserted in successive data frames, a data frame sequence, or in other suitable manners. System 500 provides flag data or other suitable data that allows the location of the inserted microthread data to be determined at the receiving end.

Figure 6:
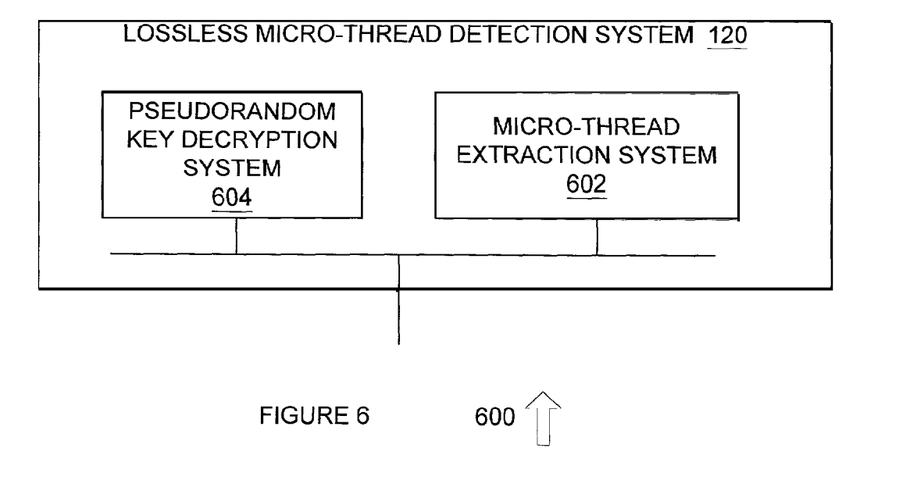
FIG. 6 is a diagram of a system for detecting the microthread data within the composite data sequence comprised of lossless data in accordance with an exemplary embodiment of the present invention.

FIG. 6 is a diagram of a system 600 for detecting the microthread data within the composite data sequence comprised of lossless data in accordance with an exemplary embodiment of the present invention. System 600 includes lossless detection system 120 and microthread extraction system 602 and key decryption system 604, each of which can be implemented in hardware, software, or a suitable combination of hardware and software, and which can be one or more software systems operating on a general purpose server platform.

Microthread extraction system 602 locates encrypted microthread data in the data frames of composite data and extracts the encrypted microthread data. In one exemplary embodiment, microthread extraction system 602 can use flag data, parsing data, or other suitable data at one or more predetermined location in the data frames of composite data to identify the location in the data frame of the encrypted microthread data, the assembly sequence for parsed encrypted microthread data, the sequence of data frames in which encrypted microthread data has been inserted, or other suitable data.

Key decryption system 604 receives the encrypted microthread data from microthread extraction system 602 and decrypts the data. In one exemplary embodiment, key decryption system 604 can receive parsing data from flags extracted by microthread extraction system 602 or other suitable data that is used to locate one or more sections of microthread data within a data frame, such as where the microthread data has been parsed and stored in two or more data frames after being encrypted. Other suitable decryption processes can be used by key decryption system 604.

In operation, system 600 extracts and decrypts microthread data from one or more data frames of composite data sequence. System 600 locates and assembles microthread data that has been parsed and stored in two or more locations, determines data frame sequence or other key data for use in extracting the microthread data, and performs other suitable functions for extracting and decrypting microthread data from lossless carrier data.

Figure 7:
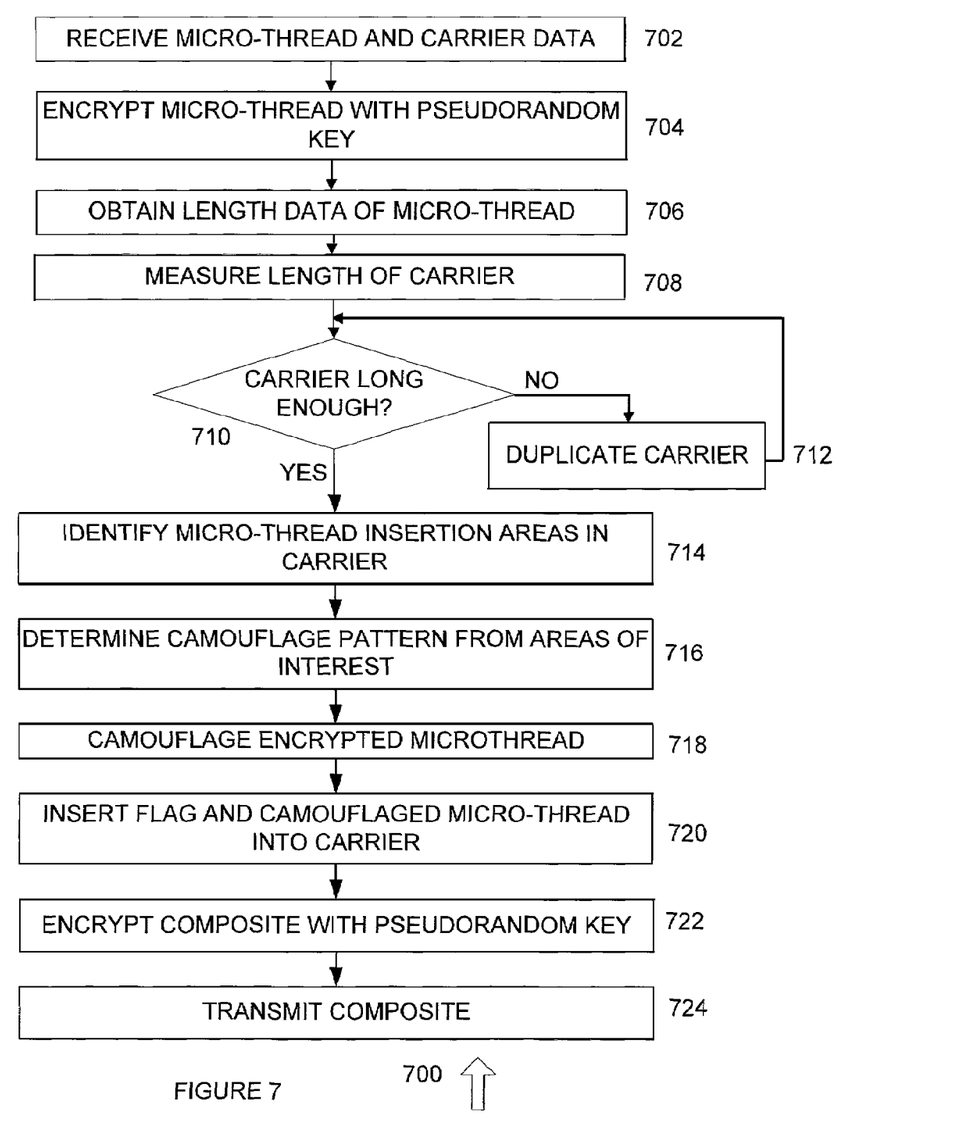
FIG. 7 is a flowchart of a method for inserting camouflaged microthread data into lossy data in accordance with an exemplary embodiment of the present invention.

FIG. 7 is a flowchart of a method 700 for inserting camouflaged microthread data into lossy data in accordance with an exemplary embodiment of the present invention. Method 700 begins at 702 where microthread data and carrier data are received. The carrier data can be lossy data, such as audio content data, video content data, or other suitable lossy data. In one exemplary embodiment, if the lossy data is audiovisual content data, then the carrier data can be the audio data, the video data, or a suitable combination of the audio data and the video data. The microthread data can include date and time stamp data, copyright data, quality of the transmission data, or other suitable data. The microthread data can be provided with the carrier data, generated locally when the carrier data is received, or generated in other suitable manners. The method then proceeds to 704.

At 704, the microthread data is encrypted, such as with a random key, a pseudorandom key, or by other suitable procedures. In one exemplary embodiment, a random or pseudorandom bit string having a predetermined length can be generated to act as the pseudorandom key. The method then proceeds to 706 where the length data of the microthread data is obtained and stored. The method then proceeds to 708.

At 708, the length data of the carrier data is obtained. The method then proceeds to 710 where it is determined whether the carrier data is of sufficient length to embed at least one instance of the encrypted microthread. In one exemplary embodiment, it can be determined whether the carrier data has a length equal to or greater than a predetermined multiple of the length of the encrypted microthread. If the carrier data is of insufficient length, then the method proceeds to 712 where the carrier data is repeated until the length of the repeated carrier data is sufficient for the encrypted microthread to be inserted. The method then proceeds to 710. If it is determined at 710 that the carrier data is of sufficient length, then the method proceeds to 714.

At 714, insertion points and areas of interest within the carrier data for embedding the encrypted microthread are identified. In one exemplary embodiment, the carrier data can be digitally sampled audio data or other suitable digitally encoded analog data. An insertion point can be determined by locating two successive values of sequential carrier data that have an absolute magnitude difference greater than a predetermined value. In another exemplary embodiment, the areas within the data stream of the carrier data that are not necessary or are unusable during digital to analog conversion can be recognized. These areas of interest can then be analyzed to determine whether they are of sufficient length to embed the encrypted microthread, whether the amount of variation in the audio data in the area of interest is sufficient to mask the insertion of the camouflaged microthread, or whether other suitable criteria are met. The areas of interest of sufficient length can then be marked with a flag data sequence, such as to provide additional verification of the starting point of the insertion of a camouflaged microthread. The method then proceeds to 716.

At 716, a camouflage pattern for the creation of the camouflaged microthread is extracted from the areas of interest within the carrier data. In one exemplary embodiment, the data sequence having the length of the encrypted microthread immediately following the flag data sequence marking the area of interest can be replicated and stored in memory as a pattern for the creation of the encrypted microthread camouflage. The method then proceeds to 718.

At 718, the encrypted microthread is camouflaged. In one exemplary embodiment, the encrypted microthread data can be subtracted from a first sequence of the camouflage pattern (D1) and added to a second sequence of the camouflage pattern (D2). In this manner, the encrypted microthread can be extracted by subtracting D1 from D2 and dividing the result by two. Other suitable mathematical operation can also be used. Flag data can also be generated, such as data that is used to determine the mathematical operation that must be performed to extract the encrypted microthread data. The method then proceeds to 720.

At 720, the flag data, camouflaged microthread data, and other suitable data are inserted into the carrier data to form the composite data. The method then proceeds to 722 where the composite data sequence is encrypted, such as by using a random key, a pseudorandom key, or other suitable processes. In one exemplary embodiment, the pseudorandom key used to encrypt the microthread data at 704 can be used to encrypt the composite data sequence. The method then proceeds to 724 where the composite data sequence is transmitted. Decryption data such as the pseudorandom key can also be transmitted, can be transmitted independently, can be used at the transmitting end with a copy of what was received (such as for verification of transmission), or other suitable procedures can be performed.

In operation, method 700 generates a composite data sequence by identifying target areas for the insertion of microthread data, camouflaging the microthread data and inserting the camouflaged microthread data in one or more locations of the carrier data. Method 700 permits the verification of the receipt of digital content, activation of processes dependent on the transmitted content or carrier data and other relevant functions.

Figure 8:
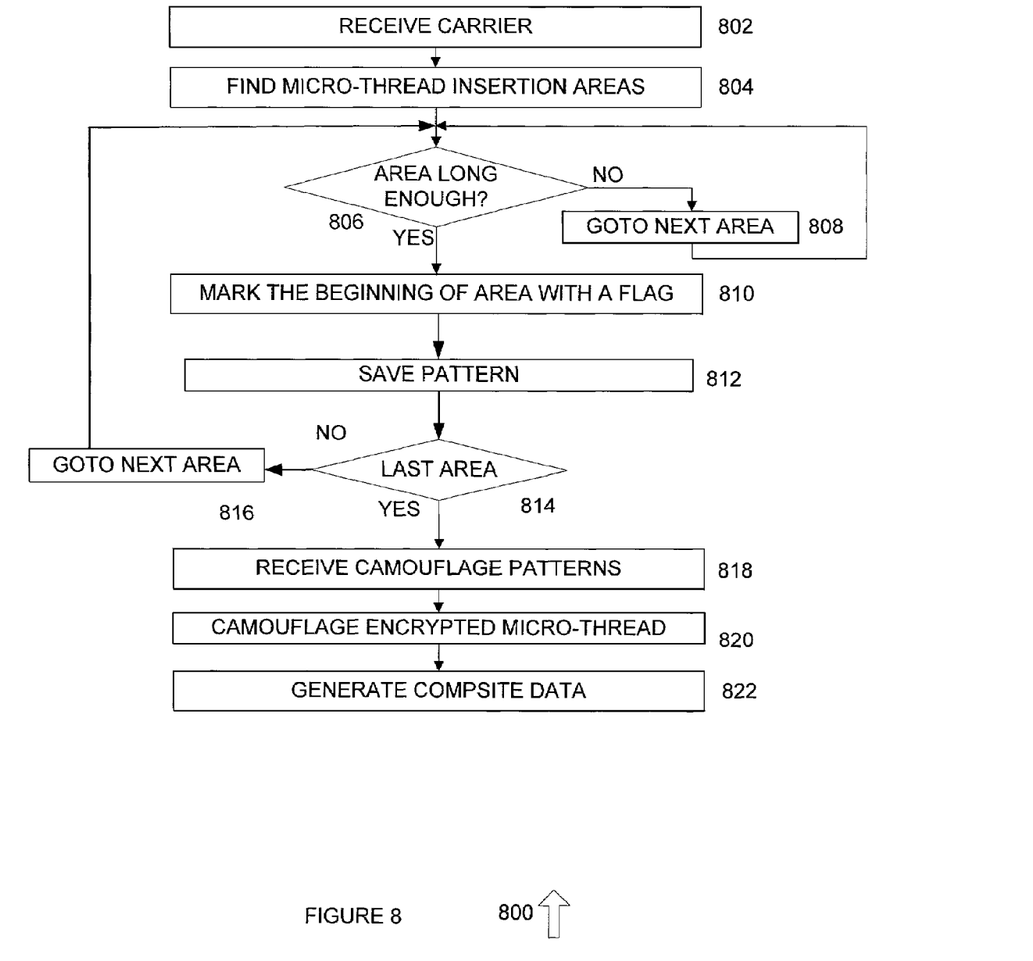
FIG. 8 is a flowchart of a method for marking areas of interest in lossy carrier data.

FIG. 8 is a flowchart of a method 800 for marking areas of interest in lossy carrier data. Method 800 begins at 802 where the lossy carrier data is received, such as digitally sampled audio data or other suitable data. The method then proceeds to 804 where one or more areas of interest within the carrier data are identified. In one exemplary embodiment, the insertion point of an area of interest can include an area where the absolute magnitude of the difference in the magnitude in two successive samples exceeds a predetermined value. In another exemplary embodiment, one or more areas within the data stream of the carrier data that are not necessary or are unusable during digital to analog conversion can be identified. The method then proceeds to 806.

At 806, it is determined whether the length of the area of interest is sufficient to embed the encrypted microthread. In one exemplary embodiment, the length of the area of interest can be sufficient if it is greater than a predetermined multiple of the length of the encrypted microthread. If the area of interest is not of sufficient length, then the method proceeds to 808 where the next area of interest is selected. The method then proceeds to 806. If it is determined at 806 that the area of interest is of sufficient length, then the method proceeds to 810 where the area of interest is marked with a flag data sequence. In one exemplary embodiment, if the area of interest is of sufficient length, then a flag data sequence can be inserted immediately prior to the area of interest and after the insertion point. The method then proceeds to 812.

At 812, the carrier data following the insertion point is stored in memory as a pattern for the encrypted microthread camouflage. The method then proceeds to 814 where it is determined whether the area of interest being replicated is the last area of interest identified at 804. If not, then the method proceeds to 816 where the next area of interest is selected. The method then proceeds to 806. In this manner, a flag data sequence can be inserted immediately before one or more areas of interest within the carrier data that are found to be of sufficient length to embed the encrypted microthread, and a camouflage pattern can be stored for each of the flagged areas of interest. Alternatively, the location of insertion points and generation of camouflaged microthread data can be performed sequentially or in other suitable manners. If it is determined at 814 that the area of interest is the last area of interest identified at 804, then the method proceeds to 818.

At 818, each of the camouflage patterns are received. The method then proceeds to 820 where a mathematical operation is performed on the camouflage pattern and the encrypted microthread to form the camouflaged microthread. In one exemplary embodiment, the camouflaged microthread can be formed by subtracting the encrypted microthread from the camouflage pattern to form a first camouflage sequence (D1), and by adding the encrypted microthread to the camouflage pattern to form a second camouflage sequence (D2). The method then proceeds to 822 where the camouflaged microthread, flag data, and other suitable data are combined to form the composite data, such as by inserting the flag data after the insertion point, and inserting D1 then D2 after the flag data.

In operation, method 800 generates a camouflaged microthread for subsequent insertion into carrier data comprised of lossy data. Method 800 allows the verification of the transmission of lossy data, where the user needs to identify the copyright owner data, the quality of the broadcast data or transmission data, the date and time stamp data, the station identification data, or other suitable data.

Figure 9:
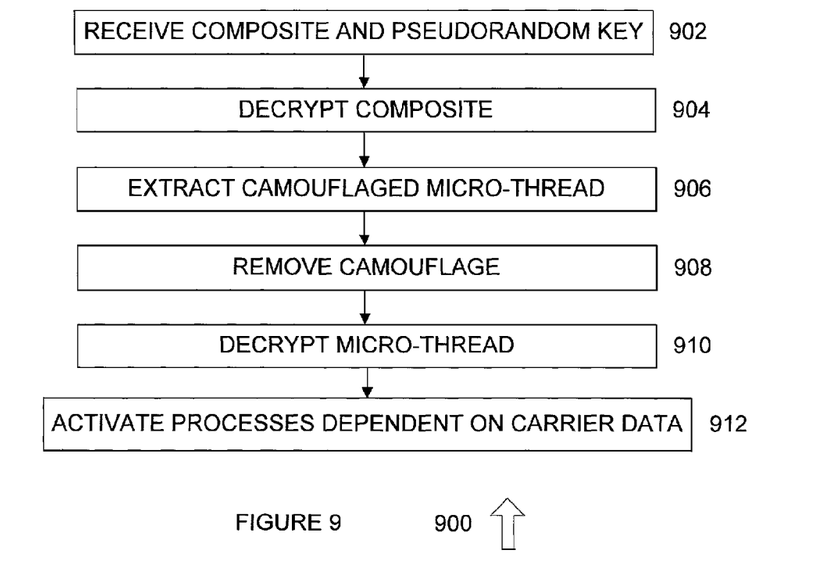
FIG. 9 is a flowchart of a method for detecting microthreads within lossy composite data sequence in accordance with an exemplary embodiment of the present invention.

FIG. 9 is a flowchart of a method 900 for detecting microthreads within lossy composite data sequence in accordance with an exemplary embodiment of the present invention. Method 900 begins at 902 where the encrypted composite data sequence and decryption data, such as a pseudorandom key, is received. The method then proceeds to 904 where the composite data sequence is decrypted using the decryption data. The method then proceeds to 906.

At 906, the camouflaged microthread is extracted from the composite data sequence. In one exemplary embodiment, the insertion points can first be identified, such as be determining areas in which the absolute magnitude in the value of two successive data points exceeds a predetermined value, and then verifying that the flag data sequence is present. The camouflaged microthreads can then be extracted from the composite data. In another exemplary embodiment, a data sequence twice the length of the encrypted microthread following the flag data sequence can be extracted as the camouflaged microthread, or other suitable processes can be used. The method then proceeds to 908.

At 908, the camouflage of the camouflaged microthread is removed to reveal the encrypted microthread. In one exemplary embodiment, the camouflage can be removed by taking the data sequence immediately following the flag data sequence of twice the length of the encrypted microthread, subtracting the first sequence from the second sequence, and dividing the result by two. Likewise, other suitable processes can be used. The method then proceeds to 910.

At 910, the encrypted microthread is decrypted using decryption data, such as a pseudorandom key or other suitable data. The method then proceeds to 912 where the processes dependent on the carrier data are activated. For example, the microthread data can provide identification of the digital content data, identification of the broadcast data or transmission data, time and date stamp data, quality of the broadcast data or transmission data, station identification data, and other suitable data to a database for accounting purposes.

In operation, method 900 allows microthread data within a composite data sequence to be detected. Method 900 allows the verification of the receipt of digital content data, the activation of processes dependent on the digital content or carrier data, and the identification of the digital content data to be performed without manual intervention.

Figure 10:
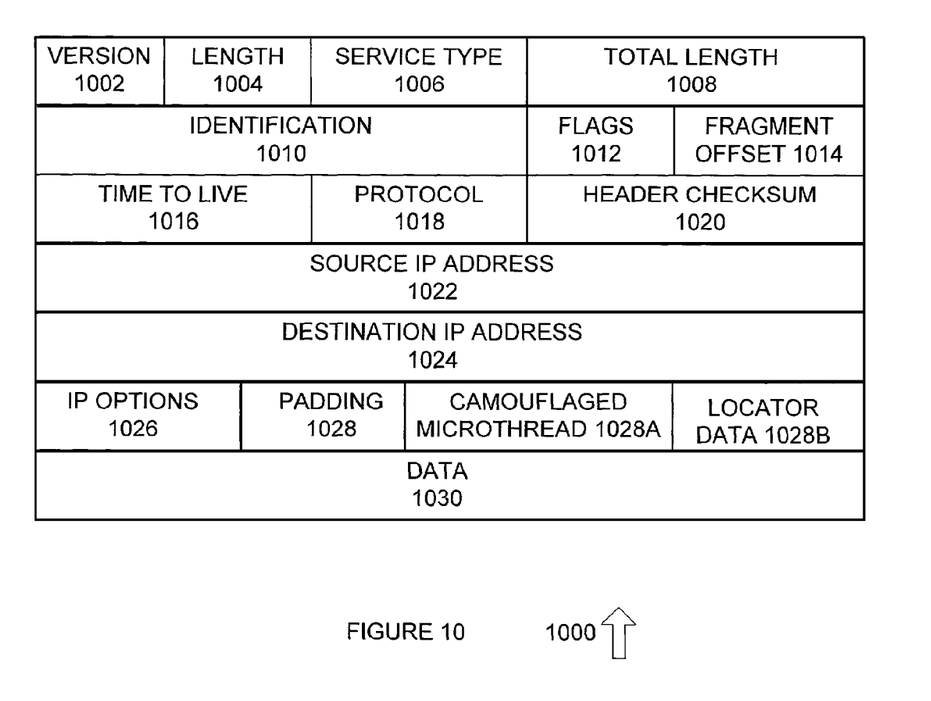
FIG. 10 is a diagram of a data frame for providing camouflaged microthread data with lossless data in accordance with an exemplary embodiment of the present invention.

FIG. 10 is a diagram of a data frame 1000 for providing camouflaged microthread data with lossless data in accordance with an exemplary embodiment of the present invention. In one exemplary embodiment, this representation can be the IP header section of lossless transmitted data.

Sequence 1002 is the first sequence of the data stream. Sequence 1002 contains version data indicating the format of the Internet header. Sequence 1004 contains Internet header length data indicating the length of the Internet header. Sequence 1006 contains type of service data indicating the desired quality of service. Sequence 1008 contains total length data indicating the length of the datagram measured in bytes, including the Internet header and data. Sequence 1010 contains identification data indicating the identifying value assigned by the sender to aid in assembling the fragments of the datagram. Sequence 1012 contains flag data representing control flags. Sequence 1014 contains fragment offset data indicating where the fragment belongs in the datagram. Sequence 1016 contains time to live data indicating the maximum time the datagram is allowed to remain in the Internet system. Sequence 1018 contains protocol data indicating the next level protocol used in the data portion of the Internet datagram. Sequence 1020 contains header checksum data indicating a checksum on the header only. Sequence 1022 contains source IP address data indicating the source IP address. Sequence 1024 contains destination IP address data indicating the destination IP address. Sequence 1026 contains IP options data indicating the options implemented by the IP modules.

Sequence 1028 is the padding data sequence of the header. In one exemplary embodiment, this can be the area of interest where the camouflaged microthread 1028A is inserted. In another exemplary embodiment, the padding data sequence of the header can include locator data 1028B that identifies a location in the payload data at which to find the microthread data, such that the payload data is used to camouflage the microthread data. In yet another exemplary embodiment, the padding sequence data can include locator data that identifies the next data frame in which the microthread data is located, either as data in the padding data sequence, data in the payload data portion of the data frame, a suitable combination of such data, or other suitable data, such as other data sequences in which the microthread data or locator data can be found. Sequence 1030 is the payload data section.

In operation, data frame 1000 allows microthread data to be inserted and camouflaged using the carrier data of the data frame, such as padding data sequences, payload data, other suitable data sequences, or a suitable combination of such data sequences. Although data frame 1000 uses the same frame structure as an IP frame header, other suitable standardized or proprietary data frames structures can also or alternatively be used, where suitable.

Figure 11:
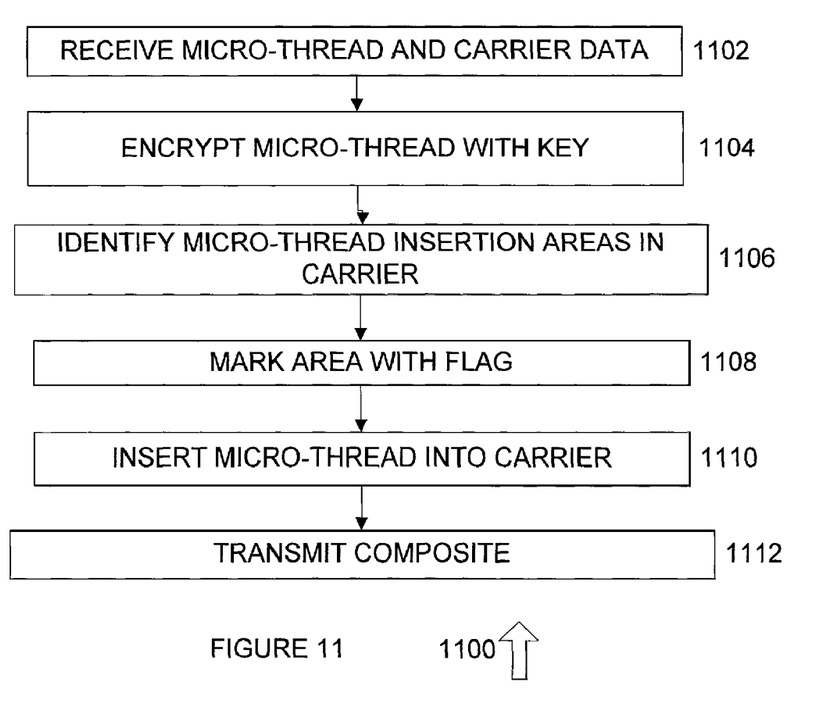
FIG. 11 is a flowchart of a method for inserting microthread data into lossless data in accordance with an exemplary embodiment of the present invention.

FIG. 11 is a flowchart of a method 1100 for inserting microthread data into lossless data in accordance with an exemplary embodiment of the present invention. Method 1100 begins at 1102 where the microthread data and the carrier data are received. The carrier data can be lossless data, such as financial data, transactional data, medical record data, or other suitable lossless data. In one exemplary embodiment, lossless data can include relevant data sequences describing routing information and control information associated with datagram delivery, such as the IP frame header, TCP header, UDP header, or other suitable protocol headers. The microthread data can be composed of the information relevant to the content signal of the carrier data, a continuous time code comprising date and time stamp data, authentication data, verification of receipt data, or other suitable data. The method then proceeds to 1104 where the microthread data is encrypted, such as with a random or pseudorandom key or by other suitable processes. In one exemplary embodiment, a random or pseudorandom bit string of any length can be generated to act as the pseudorandom key. The method then proceeds to 1106.

At 1106, an area of interest within the carrier data is identified. In one exemplary embodiment, an area of interest can include a padding data sequence of the areas of lossless data describing routing information and control information associated with datagram delivery, such as an IP frame header, a TCP header, a UDP header, or other suitable protocol headers. The method then proceeds to 1108 where the area of interest is marked with a flag data sequence. In one exemplary embodiment, a flag data sequence can be inserted immediately prior to the padding data sequence. In another exemplary embodiment, the beginning data sequence of the length of the flag data sequence can be replaced with the flag data sequence. In another exemplary embodiment, data sequence 1028 of FIG. 10 can serve as the flag data sequence. In this exemplary embodiment, marking the area of interest with an explicit flag data sequence is not required, as the flag data sequence is inherent in the frame structure. The flag data sequence can also be inserted into the payload data, such that the microthread data is included in the payload data. The flag data sequence can also include locator data that identifies the next frame in which the microthread is stored, the location within the payload data in which the microthread data is stored, the location in the data frame (such as in other data sequences of data frame 1000) in which the microthread data, flag data, or locator data is stored, or other suitable data. The method then proceeds to 1110.

At 1110, the encrypted microthread is inserted into the carrier data. The resulting data sequence is called the composite data sequence. The composite data sequence can include the encrypted microthread, the flag data sequence, the lossless data, and other suitable data. In one exemplary embodiment, the encrypted microthread can be inserted immediately after the flag data sequence. In another exemplary embodiment, a portion of the data stream of the padding data sequence of the length of the encrypted microthread can be replaced with the encrypted microthread. In another exemplary embodiment, the encrypted microthread can be inserted immediately after data sequence 1226 of FIG. 12. The method then proceeds to 1112 where the composite data sequence is transmitted. Decryption data such as the pseudorandom key can also be transmitted, can be transmitted independently, can be used at the transmitting end with a copy of what was received (such as for verification of transmission), or other suitable procedures can be performed.

In operation, method 1100 inserts an encrypted microthread in the padding data sequence of the areas of lossless data describing routing information and control information. Method 1100 allows the insertion of microthreads containing verification of receipt data, date and time stamp data, authentication data, tracking data, or other suitable data. Method 1100 permits the verification of the receipt of lossless data, the activation of processes dependent on the transmitted content or carrier, and the authentication of sensitive and confidential transactions.

Figure 12:
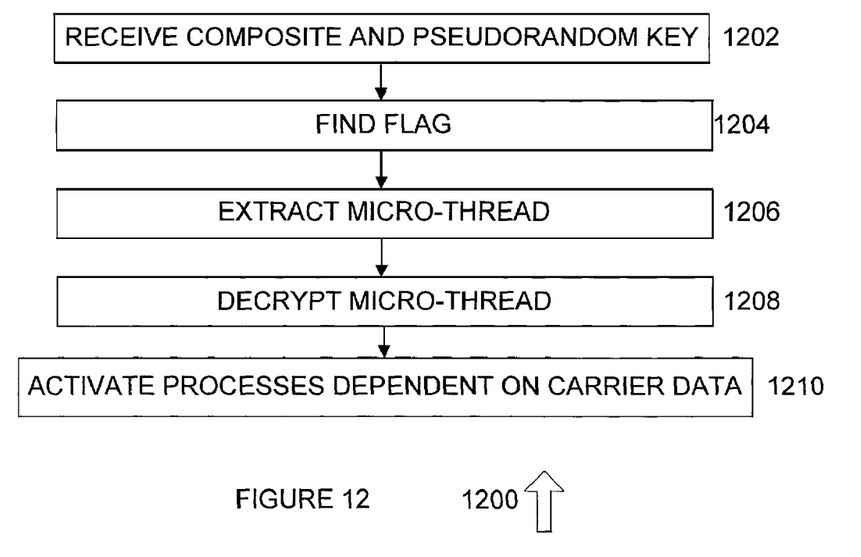
FIG. 12 is a flowchart of a method for detecting microthread data within a composite data sequence comprised of lossless data in accordance with an exemplary embodiment of the present invention.

FIG. 12 is a flowchart of a method 1200 for detecting microthread data within a composite data sequence comprised of lossless data in accordance with an exemplary embodiment of the present invention. Method 1200 begins at 1202 where the composite data sequence and decryption data, such as a pseudorandom key or other suitable data, is received. The method then proceeds to 1204.

At 1204, the flag data sequence within the composite data sequence is identified. The location of the flag data sequence can be identified using a copy of the flag data sequence, such as by transmitting the flag data sequence with the composite data sequence, prior to the composite data sequence, or in other suitable manners. In another exemplary embodiment, the pseudorandom key can contain the flag data sequence. The method then proceeds to 1206.

At 1206, the encrypted microthread is extracted from the composite data sequence. The encrypted microthread can be detected using the location of the flag data sequence or in other suitable manners. The method then proceeds to 1208.

At 1208, the encrypted microthread is decrypted using the decryption data. The method then proceeds to 1210 where any processes dependent on the carrier data are activated. For example, the processes dependent on the carrier data can include verification of the receipt of lossless data and authentication of the lossless data.

In operation, method 1200 detects and generates a copy of the microthread data within the composite data sequence comprised of lossless data, the encrypted microthread, the flag data sequence, and other suitable data. Method 1200 permits the automated verification of the receipt of lossless data, the activation of processes dependent on the lossless data, and the authentication of sensitive and confidential transactions.

In view of the above detailed description of the present invention and associated drawings, other modifications and variations will now become apparent to those skilled in the art. It should also be apparent that such other modifications and variations may be effected without departing from the spirit and scope of the present invention.

What is claimed is:

1. A system for the insertion of microthread data in transmitted data comprising:
   a digital content system providing carrier data; and
   a microthread insertion system coupled to the digital content system, the microthread insertion system generating a composite data sequence in real time for transmission that includes the carrier data and the microthread data;
      wherein the microthread data is camouflaged in real time in the composite data sequence using the carrier data.

2. The system of claim 1 wherein the microthread data insertion system further comprises:
   a key encryption system encrypting the microthread data prior to forming the composite data sequence.

3. The system of claim 1 wherein the microthread data insertion system further comprises:
   a camouflage system receiving the microthread data and the carrier data and performing a mathematical operation using the microthread data and the carrier data to generate camouflaged microthread data.

4. The system of claim 1 wherein the microthread data insertion system further comprises:
   a carrier length system determining whether the carrier data is long enough to carry the microthread data and duplicating the carrier data if the carrier data is not long enough.

5. The system of claim 1 wherein the microthread data insertion system further comprises:
   a camouflaged microthread insertion system receiving the microthread data and inserting the microthread data into the carrier data at one or more locations.

6. The system of claim 3 wherein the camouflage system further comprises
   a difference system generating camouflaged microthread data by generating two successive sections of carrier data having a difference equal to an integer times the microthread data.

7. A method for inserting microthread data in transmitted data comprising:
   receiving microthread data and carrier data;
   encrypting the microthread as encrypted microthread data;
   camouflaging the encrypted microthread data in real time using the carrier data to generate camouflaged microthread data; and
   forming a composite data sequence in real time for transmission that includes the carrier data and the camouflaged microthread data.

8. The method of claim 7 wherein receiving the carrier data further comprises:
   determining a length of the carrier data; and duplicating the carrier data until the length of the duplicated carrier data is long enough to carry the microthread data.

9. The method of claim 7 wherein camouflaging the microthread data using the carrier data comprises
   performing a mathematical operation using the encrypted microthread data and the carrier data.

10. The method of claim 7 wherein camouflaging the microthread data using the carrier data comprises
    generating two successive sections of carrier data having a difference equal to an integer times the microthread data.

11. The method of claim 7 wherein camouflaging the microthread data using the carrier data comprises
    storing the microthread data in one or more predetermined data frame locations.

12. The method of claim 7 wherein forming the composite data sequence that includes the carrier data and the camouflaged microthread data comprises:
    storing the microthread data and locator data in a first data frame location;
    using the locator data to determine a second data frame location; and
    storing the microthread in the second data frame location.

13. The method of claim 7 wherein forming the composite data sequence that includes the carrier data and the camouflaged microthread data comprises
    storing the camouflaged microthread data at one or more predetermined locations based on a predetermined data sequence of the carrier data.

14. The method of claim 13 wherein the predetermined data sequence of the carrier data is a predetermined magnitude of change in two successive data values.

15. A method for retrieving microthread data from transmitted data comprising:
    receiving transmitted data that is a composite data sequence that includes carrier data and camouflaged microthread data;
    locating the camouflaged microthread data in real time using a flag;
    extracting the camouflaged microthread data in real time; and
    extracting the microthread data from the camouflaged microthread data in real time.

16. The method of claim 15 further comprising performing one or more predetermined actions in real time using the microthread data.

17. The method of claim 15 wherein locating the camouflaged microthread data using the flag comprises locating a predetermined characteristic of the carrier data.

18. The method of claim 17 wherein the predetermined characteristic is a change in two successive values of data that exceeds a predetermined amount.

19. The method of claim 17 wherein the predetermined characteristic is a data frame location.

20. The method of claim 15 wherein extracting the microthread data from the camouflaged microthread data comprises performing a mathematical operation on the camouflaged microthread data.

* * * * *